United States Patent
Lin et al.

(10) Patent No.: US 10,261,621 B2
(45) Date of Patent: Apr. 16, 2019

(54) TOUCH DISPLAY DEVICE AND TOUCH DETECTION METHOD

(71) Applicants: XIAMEN TIANMA MICRO-ELECTRONICS CO., LTD., Xiamen (CN); TIANMA MICRO-ELECTRONICS CO., LTD., Shenzhen (CN)

(72) Inventors: Shaoting Lin, Xiamen (CN); Yuping Ma, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 171 days.

(21) Appl. No.: 15/242,956

(22) Filed: Aug. 22, 2016

(65) Prior Publication Data

US 2017/0192586 A1 Jul. 6, 2017

(30) Foreign Application Priority Data

Dec. 31, 2015 (CN) .......................... 2015 1 1027672

(51) Int. Cl.
*G06F 3/041* (2006.01)
*G06F 1/16* (2006.01)
*G06F 3/044* (2006.01)

(52) U.S. Cl.
CPC ............ *G06F 3/0416* (2013.01); *G06F 1/169* (2013.01); *G06F 1/1626* (2013.01);
(Continued)

(58) Field of Classification Search
CPC .... G06F 3/0416; G06F 1/1626; G06F 1/1643; G06F 1/169; G06F 3/0412; G06F 3/044; G06F 2203/04107; G06F 2203/04111
See application file for complete search history.

(56) References Cited

U.S. PATENT DOCUMENTS

| 2012/0242617 | A1* | 9/2012 | Lee | G06F 3/0418 345/174 |
| 2014/0048398 | A1* | 2/2014 | Jiang | H01H 13/86 200/5 A |
| 2015/0309634 | A1* | 10/2015 | Lee | G06F 3/0412 345/173 |

FOREIGN PATENT DOCUMENTS

| CN | 104769532 A | 7/2015 |
| CN | 204480204 U | 7/2015 |
| CN | 204515733 U | 7/2015 |

* cited by examiner

*Primary Examiner* — Towfiq Elahi
(74) *Attorney, Agent, or Firm* — Kilpatrick Townsend & Stockton LLP

(57) ABSTRACT

A touch display device is provided. The touch display device can comprise a touch display panel and a protection cover plate. The display panel can comprise a touch sensing region and a non-touch sensing region. The protection cover plate can be provided on the touch display panel and can comprise a display region and a non-display region that surrounds the display region. The display region can correspond to the touch sensing region, and the non-display region can comprise a touch key region. The surface of the protection cover plate that is adjacent to the touch display panel can be defined as a first surface such that a touch key electrode is provided in the touch key region on the first surface and a touch transfer electrode can be provided on the display region on the first surface. The touch key electrode can be electrically connected with the touch transfer electrode.

10 Claims, 8 Drawing Sheets

(52) U.S. Cl.
CPC ............ *G06F 1/1643* (2013.01); *G06F 3/044* (2013.01); *G06F 3/0412* (2013.01); *G06F 2203/04107* (2013.01); *G06F 2203/04111* (2013.01)

TOUCH DISPLAY DEVICE AND TOUCH DETECTION METHOD

CROSS-REFERENCES TO RELATED APPLICATIONS

This application claims priority to a Chinese patent application No. 201511027672.2 filed on Dec. 31, 2015 and entitled "touch display device and touch detection method", the disclosure of which is incorporated herein by reference in its entirety.

TECHNICAL FIELD

The present disclosure relates to the field of touch display, and in particular, to a touch display device and a touch detection method.

TECHNICAL BACKGROUND

Due to the advantages such as light and thin design, low power consumption and no radiant pollution, Liquid Crystal Display (LCD) is now widely applied to products such as TV set, notebook computer, mobile phone and personal digital assistant, etc.

At present, liquid crystal display devices of commercially available electronic products with a touch display function are generally divided into resistive, capacitive, infrared ray and ultrasonic liquid crystal display devices, among which the capacitive touch display screen has the widest application. The capacitive touch display screens mainly include on-cell touch display screens and in-cell touch display screens in which a touch screen embedded into a display module. Regardless of an on-cell touch display screen or an in-cell touch display screen, the structure of the screen includes a protection cover plate, as well as a touch unit and a display panel that are located under the protection cover plate. A common protection cover plate is made of toughened glass, has a high surface hardness and a good frictional resistance, and hence can protect the touch sensing components and the display components thereunder.

No matter it is an add-on touch display device or an in-cell touch display device, the protection cover plate thereof generally includes a display region and a peripheral non-display region, a touch key region is usually located in the non-display region outside the display region of the protection cover plate, and a touch key electrode is provided in the touch key region.

In the related art, as shown in FIG. 1, each of touch key electrodes 2211 provided on the back of a protection cover plate needs to be connected with an external flexible circuit board 44 via a respective lead 43 so as to independently transmit a touch signal to the control circuit. Therefore, a line manufacturing process, an adhering process and also a flexible circuit board binding process are required, leading to complicate processes, complex structures, and high manufacturing costs.

SUMMARY OF THE INVENTION

Therefore, an embodiment of the present disclosure is to provide a touch display device with a simple structure and a low manufacturing cost. In a first aspect, a touch display device is provided. The touch display device can include a touch display panel, a protection cover plate, and/or any other components. The touch display panel can include a touch sensing region and a non-touch sensing region. The protection plate can be provided on the touch display panel and can include a display region and a non-display region surrounding the display region. The display region can correspond to the touch sensing region, and the non-display region can include a touch key region. A surface of the protection cover plate close to the touch display panel can be defined as a first surface such that a touch key electrode is provided in the touch key region on the first surface, and a touch transfer electrode is provided on the display region of the first surface. The touch key electrode can be electrically connected with the touch transfer electrode. A closed pattern is formed by connecting each adjacent vertex or adjacent camber line of the outer contour of the touch transfer electrode. The area of the closed pattern can be greater than the area of the touch transfer electrode, or the touch transfer electrode has an annular shape.

In the second aspect, it is to provide a touch detection method that is implemented by utilizing the touch display device according to the first aspect, including:

receiving, by a control circuit, touch variances corresponding to touch sensing signals, wherein the touch variances corresponding to a touch sensing signals comprise the touch variance of the signal sensed by the touch transfer electrode and the touch variance of the signal sensed by the touch unit corresponding to the touch transfer electrode;

determining, by the control circuit, that no touch action occurs in the touch key region corresponding to the touch key electrode or a region corresponding to the touch unit corresponding to the touch transfer electrode electrically connected with the touch key electrode, in response to the touch variances corresponding to the touch sensing signals received by the control circuit being all less than a first threshold K1;

determining, by the control circuit, that a touch action occurs in the touch key region corresponding to the touch key electrode, in response to a shape of distribution of the touch variances corresponding to the touch sensing signals received by the control circuit being the same as a shape of the touch transfer electrode and the touch variance in the region corresponding to the touch transfer electrode being greater than or equal to the first threshold K1, and further in response to the touch variance in the region of the touch unit other than the region corresponding to the touch transfer electrode being less than or equal to a second threshold K2; and determining, by the control circuit, that a touch action occurs in the region corresponding to the touch unit in the touch sensing region, in response to the shape of distribution of the touch variances corresponding to the touch sensing signals received by the control circuit being the same as the shape of the touch transfer electrode and the touch variance in the region corresponding to the touch transfer electrode being greater than or equal to the first threshold K1, and further in response to the touch variance in the region of the touch unit other than the region corresponding to the touch transfer electrode being greater than the second threshold K2.

In comparison with the related art, with the touch display device according to the disclosure, a touch key electrode is provided in the touch key region of the protection cover plate, a touch transfer electrode is provided in the display region of the protection cover plate, and the touch key electrode is electrically connected with the touch transfer electrode, so that it is not required for the touch display device to provide a flexible circuit board and a lead for connecting the touch key electrode with the flexible circuit board, and thus simplifying the structure, eliminating a lead manufacturing process and a flexible circuit board binding process, and saving production costs. In addition, the area of a closed pattern formed by connecting each adjacent vertex or adjacent camber line on the periphery of the touch transfer electrode is greater than the area of the touch transfer electrode or the touch transfer electrode has an annular shape, so that the control circuit may determine through a comparison operation whether the touch action occurs in the touch key region or the display region, thereby achieving accurate control on the touch display device.

REFERENCE LABELS

Figure 1:
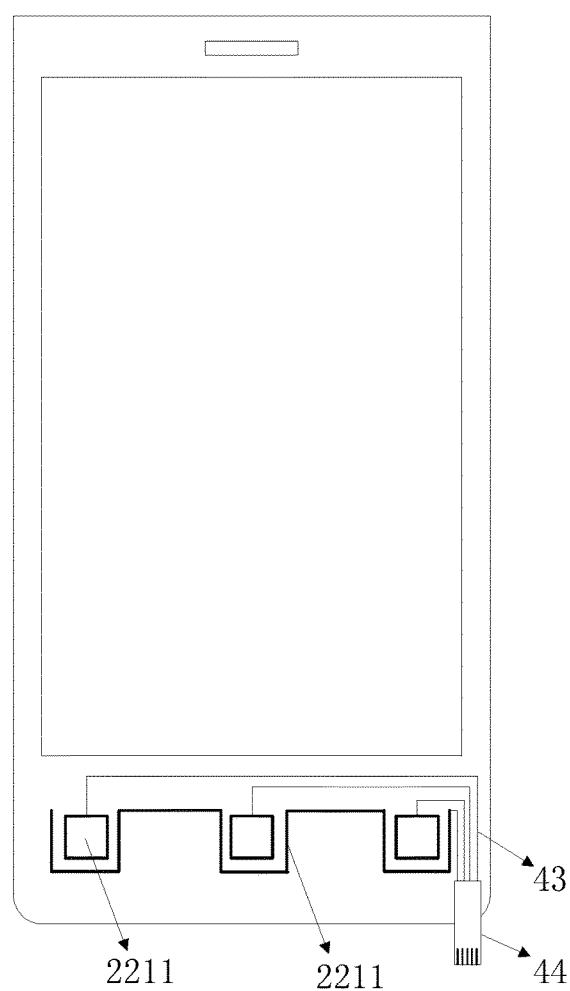
FIG. 1 is a schematic bottom view showing the protection cover plate of a touch display device of the related art.

1 Touch Display Panel
2 Protection Cover Plate
3 Control Circuit
11 Touch Unit
12 Touch Sensing Region
13 Non-Touch Sensing Region
14 Touch Electrode Layer
15 Touch Driving Electrode
16 Touch Sensing Electrode
141 Touch Electrode Block
21 Display Region
22 Non-Display Region
23 First Surface
24 Shielding layer
25 Touch Key Pattern
26 Optical Adhesive
17 First Substrate
18 Second Substrate
211 Touch Transfer Electrode
221 Touch Key Region
2211 Touch Key Electrode
27 Second Surface

DETAILED DESCRIPTION OF THE PREFERRED EMBODIMENT

The disclosure will be further illustrated in detail below in conjunction with the drawings and embodiments. It should be understood that, the specific embodiments described herein are only used for explaining the disclosure, rather than limiting the scope of the disclosure. Additionally, it should be illustrated that, for easy description, only those parts related to the disclosure, rather than the whole structure, are shown in the drawings.

Figure 3:
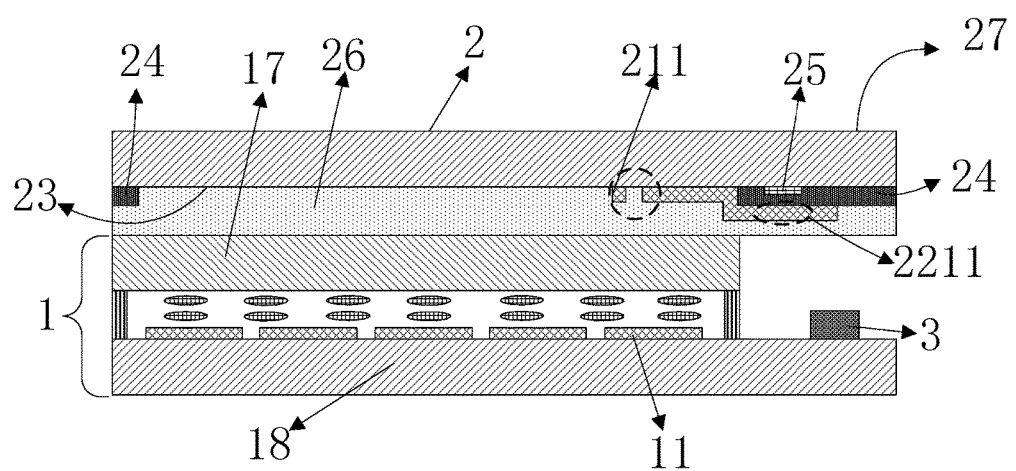
FIG. 3 is a schematic sectional view of the touch display device as shown in FIG. 2 along line AA'.

Referring to FIG. 3, it provides a touch display device, which includes a touch display panel 1, a protection cover plate 2 and a control circuit 3. The protection cover plate 2 is provided on a surface of the touch display panel 1, and the control circuit 3 is provided on the touch display panel 1.

Figure 5:
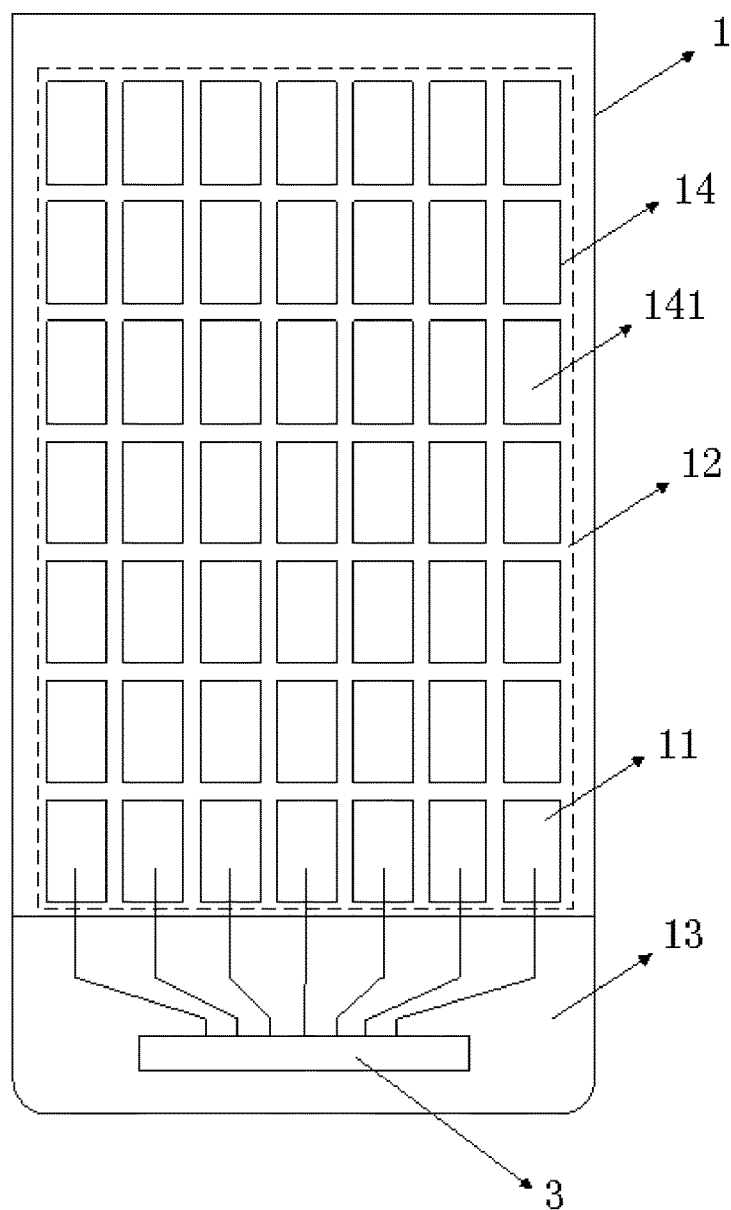
FIG. 5 is a perspective top view showing a touch display panel 1 of the touch display device as shown in FIG. 3.
Figure 7:
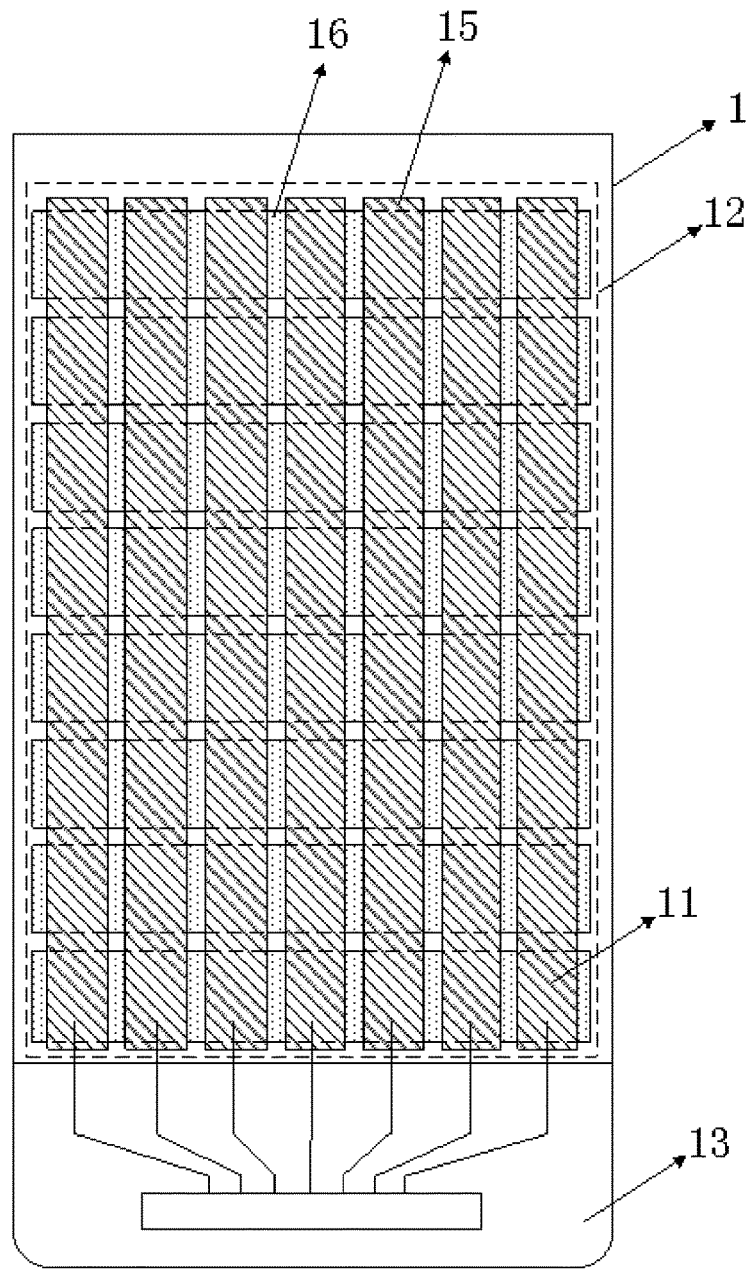
FIG. 7 is another perspective top view showing a touch display panel 1 of the touch display device as shown in FIG. 3.
Figure 8:
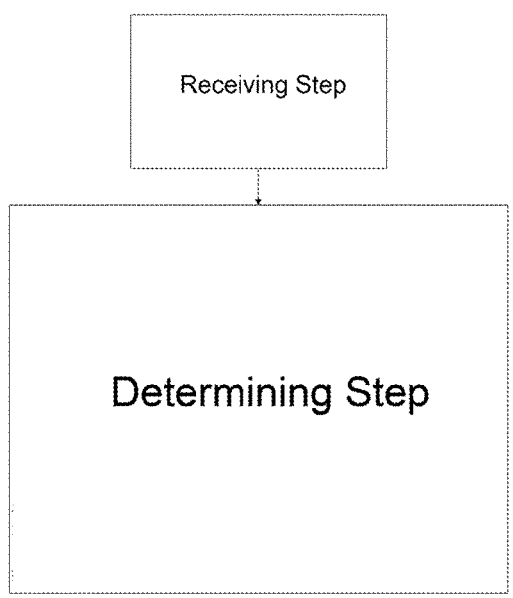
FIG. 8 is a schematic flow chart of a touch detection method according to an embodiment of the disclosure.

Referring to FIG. 5 and FIG. 7, the touch display panel 1 includes a touch sensing region 12 and a non-touch sensing region 13. The touch display panel 1 includes a plurality of touch units 11 which are provided in the touch sensing region 12 of the touch display panel 1. In some embodiments, referring to FIG. 5, the touch display panel 1 further includes a touch electrode layer 14. The touch electrode layer 14 in those embodiments is divided into a plurality of touch electrode blocks 141 arranged in an array, where each of the touch units 11 includes one of the touch electrode blocks 141. In some embodiments, referring to FIG. 7, the touch display panel 1 includes a touch driving electrode 15 and a touch sensing electrode 16, where the touch driving electrode 15 and the touch sensing electrode 16 are intersected with each other in different planes, and each of the touch units 11 includes an overlapped part of the touch driving electrode 15 and the touch sensing electrode 16.

Referring to FIG. 5, the control circuit 3 can be provided in the non-touch sensing region 13 of the touch display panel 1, for transmitting a touch driving signal to the touch display panel 1 and receiving a touch sensing signal detected by the touch display panel 1.

Figure 2:
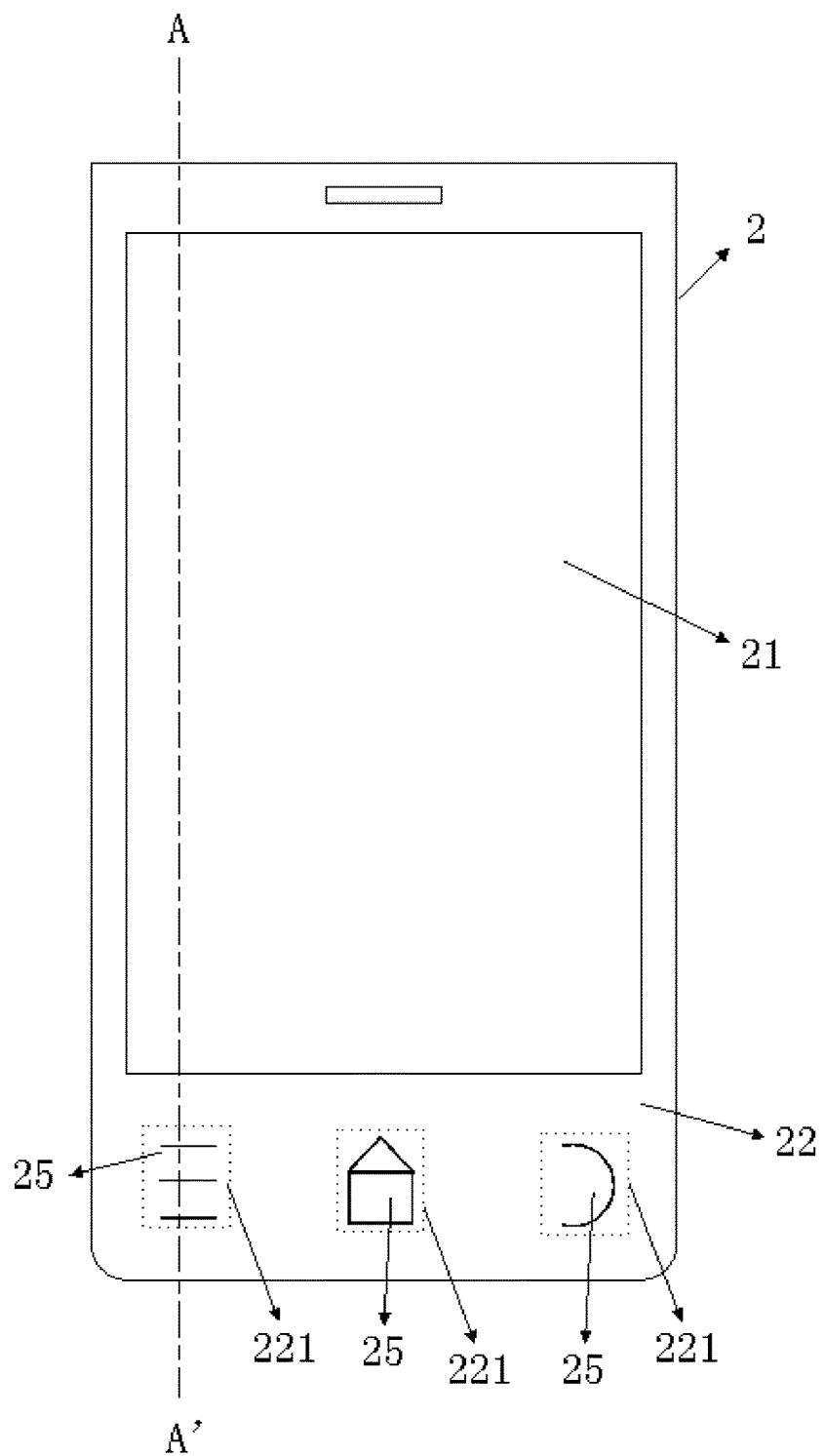
FIG. 2 is a schematic top view showing a touch display device according to an embodiment of the disclosure.
Figure 4:
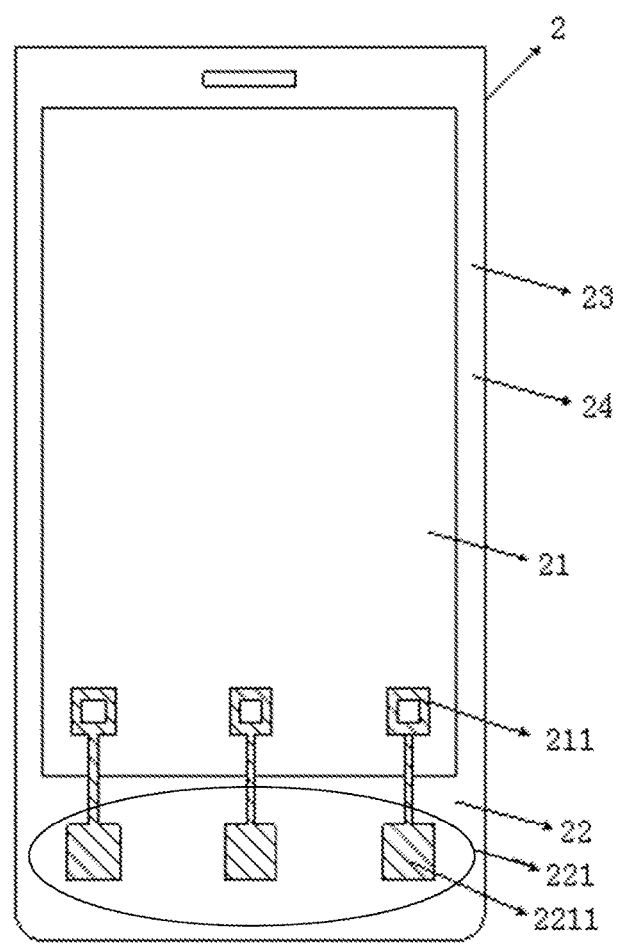
FIG. 4 is a schematic bottom view of a protection cover plate 2 of the touch display device as shown in FIG. 3.
Figure 6:
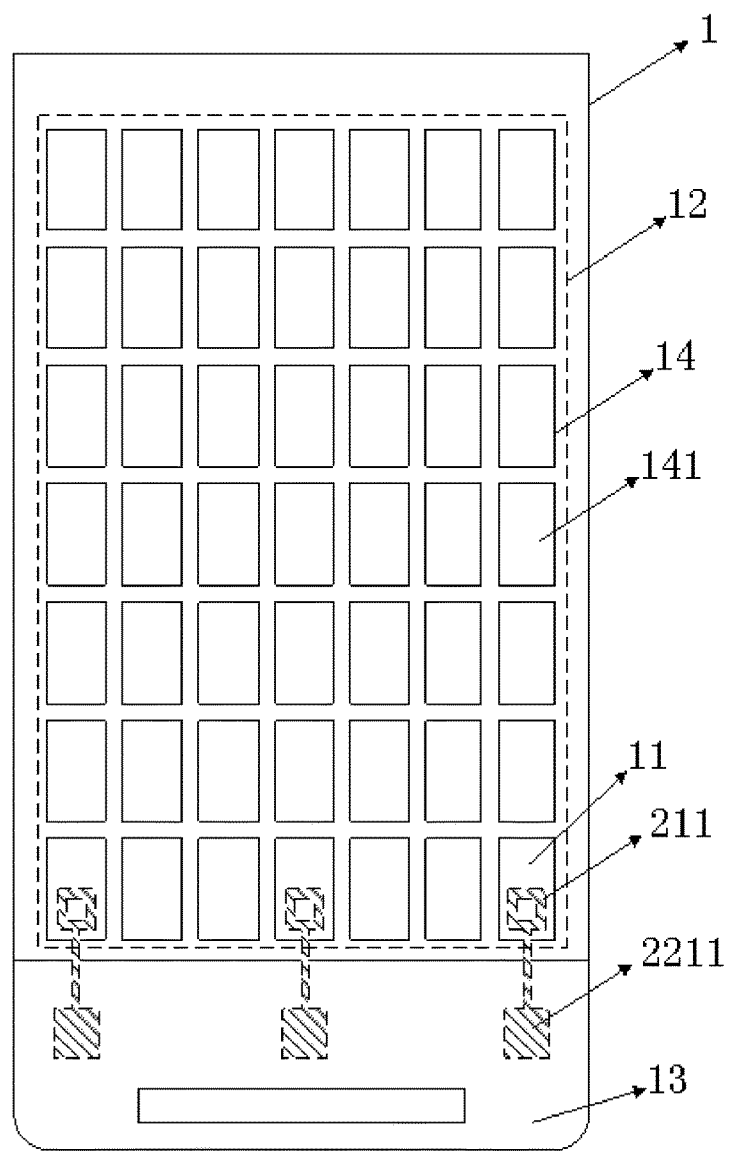
FIG. 6 a perspective top view showing the projections of the touch key electrode 2211 and the touch transfer electrode 211 on the touch display panel 1 of the touch display device as shown in FIG. 3.

Referring to FIG. 3, the protection cover plate 2 can be provided over the touch display panel 1. The surface of the protection cover plate 2 close to the touch display panel 1 can be defined as a first surface 23, and the touch display panel 1 can be adhered to the first surface 23 of the protection cover plate 2 via an optical adhesive 26. Referring to FIG. 2 and FIG. 4, the protection cover plate 2 can include a display region 21 and a non-display region 22 which surrounds the display region 21, and the display region 21 of the protection cover plate 2 corresponds to the touch sensing region 12 of the touch display panel 1 as shown in FIGS. 5 to 7. Referring to FIGS. 2 to 4, the non-display region 22 can include a touch key region 221 in the first surface 23, the touch key region 221 in the first surface 23 can be provided with a touch key electrode 2211. A touch transfer electrode 211 can be provided within the display region 21 of the first surface 23, and the touch key electrode 2211 can be electrically connected with the touch transfer electrode 211. The area of a closed pattern formed by connecting each adjacent vertex or adjacent camber line of the outer contour of the touch transfer electrode 211 can be greater than the area of the touch transfer electrode 211, or the touch transfer electrode 211 has an annular shape. That is, the shape of the touch transfer electrode 211 may be a hollow shape such as a rectangular ring, a circular ring, an elliptic ring, a triangular ring, a crosswise shape and a "田" shape. The touch key electrode 2211 and the touch transfer electrode 211 may be made of same material or different materials. In some embodiments, the touch key electrode 2211 and the touch transfer electrode 211 can be both made of transparent conducting material which may be tin indium oxide or zinc indium oxide. In some embodiments, the touch key electrode 2211 may be made of metal, and the touch transfer electrode 211 may be made of transparent conducting material which may be tin indium oxide or zinc indium oxide. Referring to FIGS. 3 and 4, the first surface 23 of the protection cover plate 2 can be further provided with a shielding layer 24 which is formed in the non-display region 22 and is arranged throughout the non-display region 22. Specifically, the shielding layer 24 may be made of black ink. Referring to FIGS. 2 to 4, the protection cover plate 2 can be further provided with a touch key pattern 25 which is arranged corresponding to the touch key electrode 2211. The touch pattern 25 can be seen by a user through a second surface 27 of the protection cover plate 2 away from the touch display panel 1.

Referring to FIG. 6, the projection of each of the touch transfer electrodes 211 on the touch display panel 1 falls into one of the touch units 11. Specifically, the area of the touch transfer electrode 211 is ⅓ of the area of the touch unit 11.

In comparison with the related art, with the touch display device according to the disclosure, a touch key electrode 2211 can be provided in the touch key region 221 of the protection cover plate 2, a touch transfer electrode 211 can be provided in the display region 21 of the protection cover plate 2, and the touch key electrode 2211 can be electrically connected with the touch transfer electrode 221, so that it is not required for the touch display device to provide a flexible circuit board and a lead for connecting the touch key electrode 2211 with the flexible circuit board, and thus simplifying the structure, eliminating a lead manufacturing process and a flexible circuit board binding process, and saving production costs. In addition, the area of a closed pattern formed by connecting each adjacent vertex or adjacent camber line of the outer contour of the touch transfer electrode 211 is greater than the area of the touch transfer electrode 211, or the touch transfer electrode 211 has an annular shape, so that the control circuit 3 may determine through a comparison operation whether the touch action occurs in the touch key region 221 or the display region 21, thereby achieving accurate control on the touch display device.

Referring to FIGS. 2, 3, 4 and 8, it provides a touch detection method that is implemented by utilizing the touch display device according to the above embodiment, and the touch detection method includes Steps S1 and S2:

receiving, by a control circuit 3, touch variances corresponding to touch sensing signals, where the touch variances corresponding to the touch sensing signals include the touch variance of the signal sensed by the touch transfer electrode 211 and the touch variance of the signal sensed by the touch unit 11 corresponding to the touch transfer electrode 211;

determining, by the control circuit 3, that no touch action occurs in the touch key region 221 corresponding to the touch key electrode 2211 or a region corresponding to the touch unit 11 corresponding to the touch transfer electrode 211 electrically connected with the touch key electrode 2211, in response to the touch variances corresponding to the touch sensing signals received by the control circuit being all less than a first threshold K1;

determining, by the control circuit 3, that a touch action occurs in the touch key region 221 corresponding to the touch key electrode 2211, in response to a shape of distribution of the touch variances corresponding to the touch sensing signals received by the control circuit being the same as a shape of the touch transfer electrode 211 and the touch variance in the region corresponding to the touch transfer electrode 211 being greater than or equal to the first threshold K1, and further in response to the touch variance in the region of the touch unit 11 other than the region corresponding to the touch transfer electrode 211 being less than or equal to a second threshold K2; and determining, by the control circuit 3, that a touch action occurs in the region corresponding to the touch unit 11 in the touch sensing region 12, in response to the shape of distribution of the touch variances corresponding to the touch sensing signals received by the control circuit 3 being the same as the shape of the touch transfer electrode 211 and the touch variance in the region corresponding to the touch transfer electrode 211 being greater than or equal to the first threshold K1, and further in response to the touch variance in the region of the touch unit 5 other than the region corresponding to the touch transfer electrode 211 being greater than the second threshold K2.

In comparison with the related art, the shape of the touch transfer electrode 211 is specifically defined, so that the control circuit 3 may determine through a comparison operation whether the touch action occurs in the touch key region 221 or the display region 21, thereby achieving accurate control on the touch display device.

Although some preferred embodiments of the disclosure have been disclosed above, these embodiments are not used for limiting the disclosure. Based on the above disclosed method and technical contents, possible variations and modifications may be made by one skilled in the art on the technical solutions of the disclosure without departing from the spirit and scope of the disclosure. Therefore, any simple modifications, equivalent variations and modifications made on the above embodiments according to the technical essence without departing from the technical solutions of the disclosure will fall into the protection scope of the technical solutions of the disclosure.

The invention claimed is:

1. A touch display device, comprising:
   a touch display panel, wherein the touch display panel comprises a touch sensing region, a non-touch sensing region, a plurality of touch units and a touch electrode layer, wherein the touch electrode layer is divided into touch electrode blocks arranged in an array, and each of the plurality of touch units comprises one of the touch electrode blocks;
   a protection cover plate provided over the touch display panel, the protection cover plate comprising a display region and a non-display region surrounding the display region, wherein the display region corresponds to the touch sensing region, and the non-display region comprises a touch key region; and
   a control circuit provided in the non-touch sensing region of the touch display panel, for transmitting a touch driving signal to the touch display panel and receiving a touch sensing signal detected by the touch display panel, wherein the control circuit is configured to determine an action occurring in the touch key region or the display region through a comparison operation;
   wherein a surface of the protection cover plate close to the touch display panel is defined as a first surface such that a touch key electrode is provided in the touch key region on the first surface, a touch transfer electrode is provided in the display region on the first surface, the touch key electrode is directly electrically connected with the touch transfer electrode, and the touch transfer electrode is disposed in a layer different from a layer in which the plurality of touch units are disposed;
   wherein a closed pattern is formed by connecting each adjacent vertex or adjacent camber line of the outer contour of the touch transfer electrode, wherein an area of the closed pattern is greater than the area of the touch transfer electrode, or the touch transfer electrode has an annular shape, wherein
   the projection of the touch transfer electrode on the touch display panel falls into one of the touch units.

2. The touch display device according to claim 1, wherein, the touch key electrode and the touch transfer electrode are both made of transparent conducting material.

3. The touch display device according to claim 1, wherein, the touch key electrode is made of metal, and the touch transfer electrode is made of transparent conducting material.

4. The touch display device according to claim 2, wherein, the transparent conducting material is tin indium oxide or zinc indium oxide.

5. The touch display device according to claim 1, wherein, an area of the touch transfer electrode is 1/3 of an area of each of the touch units.

6. The touch display device according to claim 1, wherein, the touch display panel comprises a touch driving electrode and a touch sensing electrode, the touch driving electrode and the touch sensing electrode are intersected with each other in different planes, and each of the touch units comprises an overlapped part of the touch driving electrode and the touch sensing electrode.

7. The touch display device according to claim 1, wherein, the first surface of the protection cover plate is further provided with a shielding layer formed in the non-display region.

8. The touch display device according to claim 1, wherein, the protection cover plate is further provided with a touch key pattern arranged corresponding to the touch key electrode.

9. The touch display device according to claim 1, wherein, the touch display panel is adhered to the first surface of the protection cover plate via an optical adhesive.

10. A touch detection method implemented by utilizing the touch display device according to claim 1, comprising:

receiving, by a control circuit, touch variances corresponding to touch sensing signals, wherein the touch variances corresponding to a touch sensing signals comprise the touch variance of the signal sensed by the touch transfer electrode and the touch variance of the signal sensed by the touch unit corresponding to the touch transfer electrode;

determining, by the control circuit, that no touch action occurs in the touch key region corresponding to the touch key electrode or a region corresponding to the touch unit corresponding to the touch transfer electrode electrically connected with the touch key electrode, in response to the touch variances corresponding to the touch sensing signals received by the control circuit being all less than a first threshold K1;

determining, by the control circuit, that a touch action occurs in the touch key region corresponding to the touch key electrode, in response to a shape of distribution of the touch variances corresponding to the touch sensing signals received by the control circuit being the same as a shape of the touch transfer electrode and the touch variance in the region corresponding to the touch transfer electrode being greater than or equal to the first threshold K1, and further in response to the touch variance in the region of the touch unit other than the region corresponding to the touch transfer electrode being less than or equal to a second threshold K2; and determining, by the control circuit, that a touch action occurs in the region corresponding to the touch unit in the touch sensing region, in response to the shape of distribution of the touch variances corresponding to the touch sensing signals received by the control circuit being the same as the shape of the touch transfer electrode and the touch variance in the region corresponding to the touch transfer electrode being greater than or equal to the first threshold K1, and further in response to the touch variance in the region of the touch unit other than the region corresponding to the touch transfer electrode being greater than the second threshold K2.

* * * * *